United States Patent
Xu et al.

(10) Patent No.: US 12,366,268 B1
(45) Date of Patent: Jul. 22, 2025

(54) ACTUATOR CONTROL FOR DRIVETRAIN DISCONNECT ASSEMBLY

(71) Applicant: FCA US LLC, Auburn Hills, MI (US)

(72) Inventors: Chengyi Xu, Oakville (CA); Rama Rohit Varma Sagi, St. Joseph, MI (US); Nadirsh D Patel, Farmington Hills, MI (US); Krishna Chaitanya Reddy Madireddy, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/591,235

(22) Filed: Feb. 29, 2024

(51) Int. Cl.
| F16D 27/118 | (2006.01) |
| F16D 17/02 | (2006.01) |
| F16D 27/14 | (2006.01) |
| F16D 27/00 | (2006.01) |
| F16H 61/28 | (2006.01) |

(52) U.S. Cl.
CPC .............. *F16D 27/14* (2013.01); *B60K 17/02* (2013.01); *F16D 27/118* (2013.01); *F16D 2027/002* (2013.01); *F16D 2500/1022* (2013.01); *F16D 2500/10412* (2013.01); *F16D 2500/10462* (2013.01); *F16D 2500/1107* (2013.01); *F16D 2500/30408* (2013.01); *F16H 2061/2853* (2013.01)

(58) Field of Classification Search
CPC .................. F16D 27/118; F16D 27/14; F16D 2500/1022; F16D 2500/30408; F16D 2061/2853

See application file for complete search history.

(56) References Cited

U.S. PATENT DOCUMENTS

| 2015/0114786 A1* | 4/2015 | Seidl ...................... F16D 27/118 192/66.1 |
| 2017/0028846 A1* | 2/2017 | Takaira ................... B60K 17/35 |
| 2022/0112924 A1* | 4/2022 | Kluge .................... F16D 27/108 |
| 2023/0167861 A1* | 6/2023 | Paielli ................... F16D 48/064 701/67 |

FOREIGN PATENT DOCUMENTS

| CN | 111094781 A * | 5/2020 | ............ F16D 21/04 |
| WO | WO-2016088232 A1 * | 6/2016 | |

* cited by examiner

*Primary Examiner* — Stacey A Fluhart
(74) *Attorney, Agent, or Firm* — Jeremy J. Klobucar

(57) ABSTRACT

A method of controlling an actuator for a drivetrain disconnect assembly includes actuating a solenoid to achieve multiple phases of movement, where the movement may be controlled differently in the different phases. The method includes actuating a solenoid of an actuator to drive a first clutch member along an axis and relative to a second clutch member between a first position, a second position, a third position and a fourth position. Movement of the first clutch member between the second position and the third position is at a faster rate than is the movement of the first clutch member: a) between the first position and the second position; and b) between the third position and the fourth position.

20 Claims, 4 Drawing Sheets

ACTUATOR CONTROL FOR DRIVETRAIN DISCONNECT ASSEMBLY

FIELD

The present disclosure relates to controlling an actuator and drivetrain disconnect assembly.

BACKGROUND

Vehicles may include torque transfer devices like clutches that are selectively actuated to engaged and disengaged positions to selectively transmit torque therethrough. Movement of components of these devices can cause noise, vibration and forces noticeable by occupants of the vehicle as components of the devices engage each other and/or when components reach an end of travel or engage a stop surface. Further, engagement of rotating components can be inhibited by misalignment and binding of the components as they are slidably moved relative to each other while rotating.

SUMMARY

In at least some implementations, a method of controlling an actuator for a drivetrain disconnect assembly includes actuating a solenoid in multiple phases. The method includes actuating a solenoid of an actuator to drive a first clutch member along an axis and relative to a second clutch member between a first position and a second position in which are not axially overlapped with teeth of the second clutch member. The method includes actuating the solenoid to drive the first clutch member from the second position to a third position in which the teeth of the first clutch member are partially axially overlapped with the teeth of the second clutch member. And the method includes actuating the solenoid to drive the first clutch member from the third position to a fourth position in which the teeth of the first clutch member have a greater extent of axial overlap with the teeth of the second clutch member than when the solenoid is in the third position. Movement of the first clutch member between the second position and the third position is at a faster rate than is the movement of the first clutch member: a) between the first position and the second position; and b) between the third position and the fourth position.

In at least some implementations, the rate of movement of the first clutch member between the first position and the second position, and between the second position and the third position, and between the third position and the fourth position is controlled as a function of a predetermined movement profile. In at least some implementations, feedback from a position sensor is used to control the rate of movement of the first clutch member relative to the predetermined movement profile. In at least some implementations, a magnitude of current supplied to the solenoid is adjusted as a function of the feedback from the position sensor when an actual position of the first clutch member differs by more than a threshold amount from an expected position of the first clutch member according to the predetermined movement profile.

In at least some implementations, actuating the solenoid to drive the first clutch member from the second position to the third position is accomplished with a greater magnitude of current provided to the solenoid than when the solenoid is actuated to move the first clutch member between the first and second position or between the third and fourth position.

In at least some implementations, the first position is the end of movement of the first clutch member in a first direction and the fourth position is the end of movement of the first clutch member in a second direction that is opposite to the first direction.

In at least some implementations, the predetermined movement profile includes a constant rate of movement of the first clutch member between the first position and the second position. In at least some implementations, the predetermined movement profile includes a constant rate of movement of the first clutch member between the third position and the fourth position.

In at least some implementations, movement of the first clutch member from the second position to the third position causes initial axial overlap of the teeth of the first clutch member with the teeth of the second clutch member.

In at least some implementations, the first clutch member is driven from the fourth position toward the first position to an intermediate disengaged position in which the teeth of the first clutch member are not axially overlapped with the teeth of the second clutch member, and the first clutch member is driven at a rate of movement that is greater than the rate of movement of the first clutch member from the third position to the fourth position. In at least some implementations, the first clutch member is driven from the intermediate disengaged position to the first position at a rate of movement that is less than the rate of movement of the first clutch member from the fourth position to the intermediate disengaged position.

In at least some implementations, a method of controlling an actuator for a drivetrain disconnect assembly includes:
  (a) driving a solenoid of an actuator to cause a first rate of movement of a first clutch member relative to a second clutch member from a first position in which teeth of the first clutch member have a maximum spacing from teeth of a second clutch member and to a second position in which the spacing is less than the maximum spacing;
  (b) driving the solenoid with an increased current to move the first clutch member from a position in which the teeth of the first clutch member initially overlap with the teeth of the second clutch member to a partially overlapped position in which the teeth of the first clutch member are overlapped with the teeth of the second clutch member less than a full extent of overlap; and
  (c) driving the solenoid to move the first clutch member from the partially overlapped position to a maximum overlap position at a second rate selected to reduce noise associated with this movement of the first clutch member.

In at least some implementations, the method also includes:
  (d) driving the solenoid with an increased current to move the first clutch member from the maximum overlap position to a position in which the teeth of the first clutch member do not overlap with the teeth of the second clutch member but wherein the first clutch member is spaced from the first position; and
  (e) driving the solenoid at a reduced rate or with a reduced magnitude of current compared to step (d) to move the first clutch member to the first position.

In at least some implementations, the rate of movement of the first clutch member in step (a), step (b) and step (c) is controlled as a function of a predetermined movement profile.

In at least some implementations, a magnitude of current supplied to the solenoid is adjusted as a function of the feedback from the position sensor when an actual position of the first clutch member differs by more than a threshold amount from an expected position of the first clutch member according to the predetermined movement profile.

In at least some implementations, the rate of movement of the first clutch member in step (d) and step (e) is controlled as a function of a predetermined movement profile. In at least some implementations, feedback from a position sensor is used to control the rate of movement of the first clutch member relative to the predetermined movement profile.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
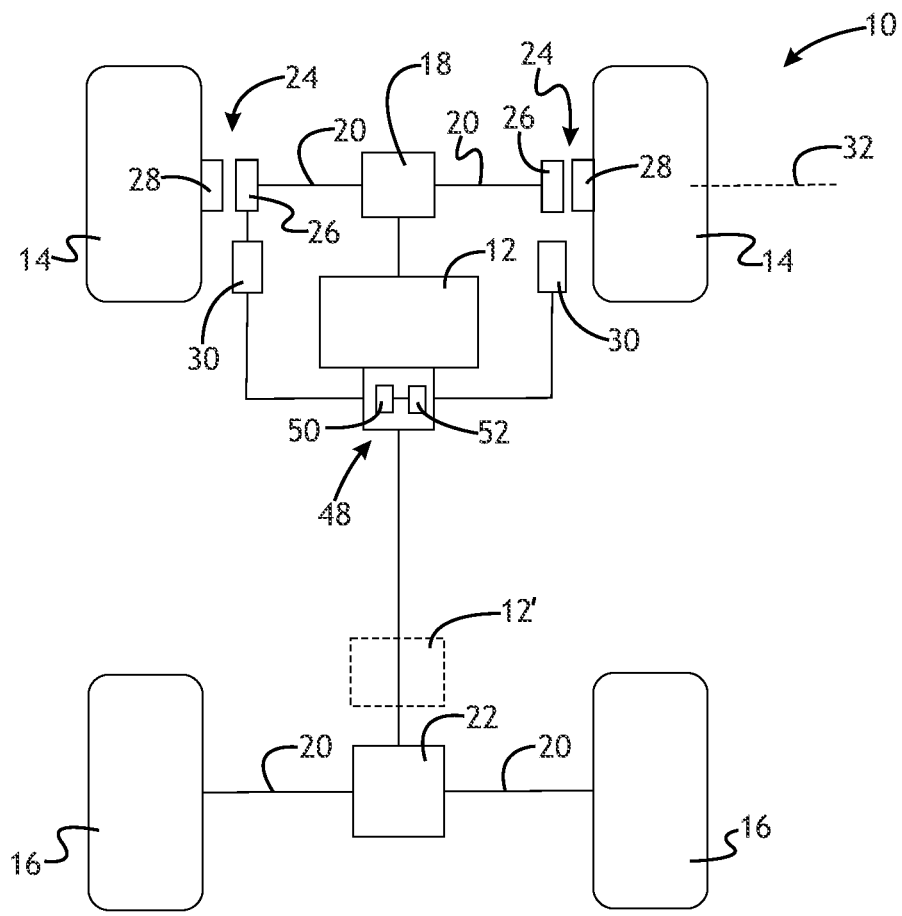
FIG. 1 is a diagrammatic view of a vehicle drivetrain system including disconnect assemblies associated with front wheels of the vehicle.

Referring in more detail to the drawings, FIG. 1 is a diagrammatic view of part of a vehicle drivetrain 10. The drivetrain 10 includes a prime mover 12, which may be a combustion engine, electric motor or both as in a hybrid vehicle. Power may be transferred from the prime mover 12 to one or more front wheels 14 or rear wheels 16 through a differential 18 and side shafts 20 that are coupled to respective ones of the wheels 14, 16. In the example shown, the drivetrain 10 is rear-wheel drive based with a selectable all-wheel drive mode. In this example, the rear wheels 16 are driven by the prime mover 12 through a rear differential 22 and the front wheels 14 are driven only in the all-wheel drive mode of vehicle operation. The prime mover may include more than one electric motor in at least some implementations. In this regard, a second prime mover 12' is shown in dashed lines in FIG. 1 and is arranged to drive the rear wheels, while the other prime mover 12 is arranged to drive the front wheels.

To achieve all-wheel drive mode, the front wheels 14 are coupled to the prime mover 12 through one or more disconnect devices 24 that pass torque therethrough in one position but do not pass torque therethrough in a second position. The disconnect devices 24 in this example are two clutches 24, with one clutch 24 located between the differential 18 and a respective one of the front wheels 14 so that each wheel 14 is associated with one clutch 24. While shown as being so-called "wheel-end" disconnect clutches located at the wheel hub, the clutches 24 could be located between the differential 18 and side shaft 20 or otherwise as desired. Further, the drivetrain 10 could instead be front-wheel based with the disconnect device(s) associated with the rear wheels 16 to selectively disconnect or connect the rear wheels 16 from the prime mover 12 torque flow. In the case of a two-motor system, the motors may be arranged to separately drive front and rear axles/shafts to drive the front wheels and rear wheels as noted, and a drive shaft (schematically illustrated in FIG. 1) between the front and rear axles/shafts is not needed.

Figure 2:
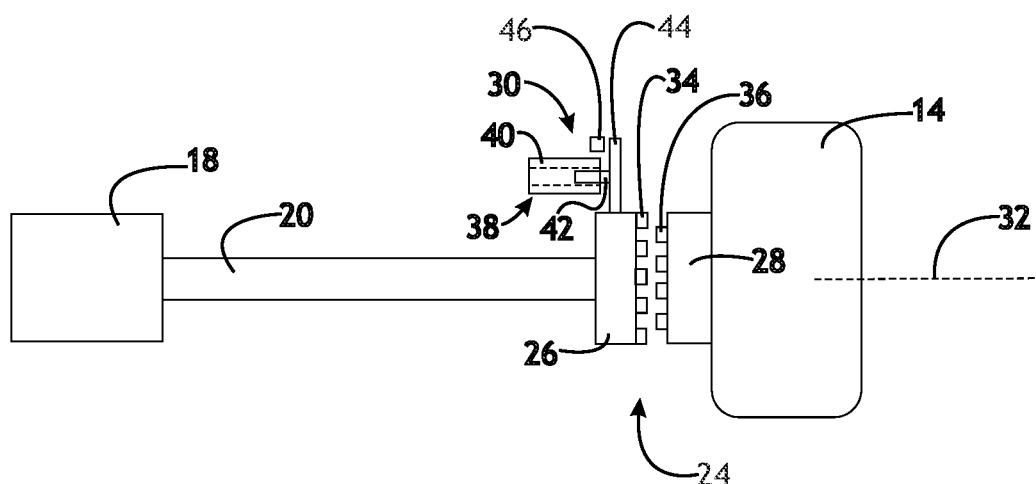
FIG. 2 is a diagrammatic view of part of the drivetrain showing a disconnect assembly for one front wheel.

As shown in FIGS. 1 and 2, the clutches 24 can be any type of clutch 24 having a first clutch member 26 that is movable relative to a second clutch member 28 by an actuator 30. In at least some implementations, dog clutches 24 are used. The dog clutches 24 have a first clutch member 26 coupled to the side shaft 20 for co-rotation with the side shaft 20 about an axis 32 of rotation, and a second clutch member 28 coupled to the wheel 14. The first clutch member 26 includes a circumferential array of teeth 34 that extend axially toward the second clutch member 28, and the second clutch member 28 includes a complementarily arranged circumferential array of teeth 36 that extend axially toward the first clutch member 26. While rotationally coupled to the side shaft 20, the first clutch member 26 is able to move axially along the side shaft 20.

When the clutch 24 is in a disengaged state, the first clutch member 26 is axially spaced from the second clutch member 28 so that the teeth 34 of the first clutch member 26 are spaced from and are not engaged or in contact with the teeth 36 of the second clutch member 28. In the disengaged state, torque is not transferred from the first clutch member 26 to the second clutch member 28. When the clutch 24 is in an engaged state, the teeth 34 of the first clutch member 26 and second clutch member 28 are meshed together, the first clutch member 26 driving engages the second clutch member 28 so that they co-rotate. In the engaged state, torque is transferred from the first clutch member 26 to the second clutch member 28 and its associated wheel. Thus, when the clutches 24 are in the engaged state, the front wheels 14 of the vehicle are actively driven and when the clutches 24 are in the disengaged state, the front wheels 14 are not actively driven.

To change the state of a clutch 24, an actuator 30 is associated with each clutch 24 and arranged to move the first clutch member 26 relative to the second clutch member 28. In at least some implementations, the actuator 30 is an electro-mechanical device that utilizes a solenoid 38 to move the first clutch member 26. The solenoid 38 includes an annular wire coil 40 and a magnetically responsive armature 42 received within the wire coil 40. When electricity is supplied to the wire coil 40, an electromagnetic field is generated and the armature 42 is driven from a first position to a second position by the electromagnetic field. In at least some implementations, the armature 42 may be driven from the first position to the second position by one or both of: a) the electromagnetic field generated by electricity provided to the wire coil 40 of a first polarity; and b) a secondary actuator such as a biasing member (e.g. a spring). In at least some implementations, the armature 42 may be driven from the second position to the first position by one or both of: a) an electromagnetic field generated by electricity provided to the coil 40 of an opposite, second polarity; and b) a secondary actuator such as a biasing member (e.g. a spring). That is, the armature 42 can be driven in one direction by an electromagnetic field and in the opposite direction by a secondary actuator like a spring, or the armature 42 can be driven in both directions by electromagnetic fields with or without an assisting force from a secondary actuator like a spring in either or both directions.

The armature 42 is coupled to or otherwise associated with the first clutch member 26 so that movement of the armature 42 causes or permits a corresponding movement of the first clutch member 26 relative to the second clutch member 28. In the example shown, the armature 42 engages or is coupled to a lever 44 that engages or is coupled to the first clutch member 26. In this way, the solenoid 38 can be driven to control the state of the clutch 24 between the engaged and disengaged states. To enable determination of the position of the armature 42 and/or the first clutch member 26, one or more position sensors 46 are associated with one or both of these components. The position sensor 46 or sensors could be responsive to movement of one or both components or with another component (e.g. the lever 44) that moves in conjunction with the first clutch member 26 or armature 42.

To enable torque to be transmitted through the clutch members 26, 28, they are formed of a durable material like steel or aluminum and the engagement and disengagement of the clutch teeth 34, 36 can cause noise and vibrations or forces noticeable to occupants of the vehicle. It has been found that the noise, vibration and harshness of the clutch engagement and disengagement, which may be caused by the armature 42 reaching or contacting stop surfaces at one or both ends of its travel, and by engagement or disengagement of the clutch teeth 34, 36, can be reduced by varying the speed and/or force under which the first clutch member 26 is moved relative to the second clutch member 28. To do this, a control system 48 is used to provide electricity to the wire coil 40 of the solenoid 38 in a desired way, which varies over the duration and distance of movement of the first clutch member 26. The control system 48 may include one or more controllers, control modules and/or processors to execute instructions or program(s) in memory accessible by the control system 48 to provide a desired actuation of the solenoid 38 and clutch 24.

In order to perform the functions and desired processing set forth herein, as well as the computations therefore, the control system 48 may include, but is not limited to, one or more controller(s), processor(s), computer(s), DSP(s), memory, storage, register(s), timing, interrupt(s), communication interface(s), and input/output signal interfaces, and the like, referred to be reference numeral 50 in FIG. 1, as well as combinations comprising at least one of the foregoing. For example, the control system 48 may include input signal processing and filtering to enable accurate sampling and conversion or acquisitions of such signals from communications interfaces and sensors. As used herein the terms control system 48 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. The control system 48 may be distributed among different vehicle modules, such as an infotainment control module, engine control module or unit, powertrain control module, transmission control module, and the like, if desired. Further, in a system utilizing one or more electric motors as the prime mover, the controllers 50 for the motor(s) may be separate from the controller used to drive the actuator, if desired. The simplified view of FIG. 1 which shows a single box as a controller is not intended to limit the number, location or type of controllers that may be used. Further, a separate controller can be used for the actuator 30 of each clutch 24, or a single controller may control more than one actuator 30, as desired.

The term "memory" or "storage" as used herein can include volatile memory and/or non-volatile memory, generally referred to by reference numeral 52 in FIG. 1. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

Figure 3:
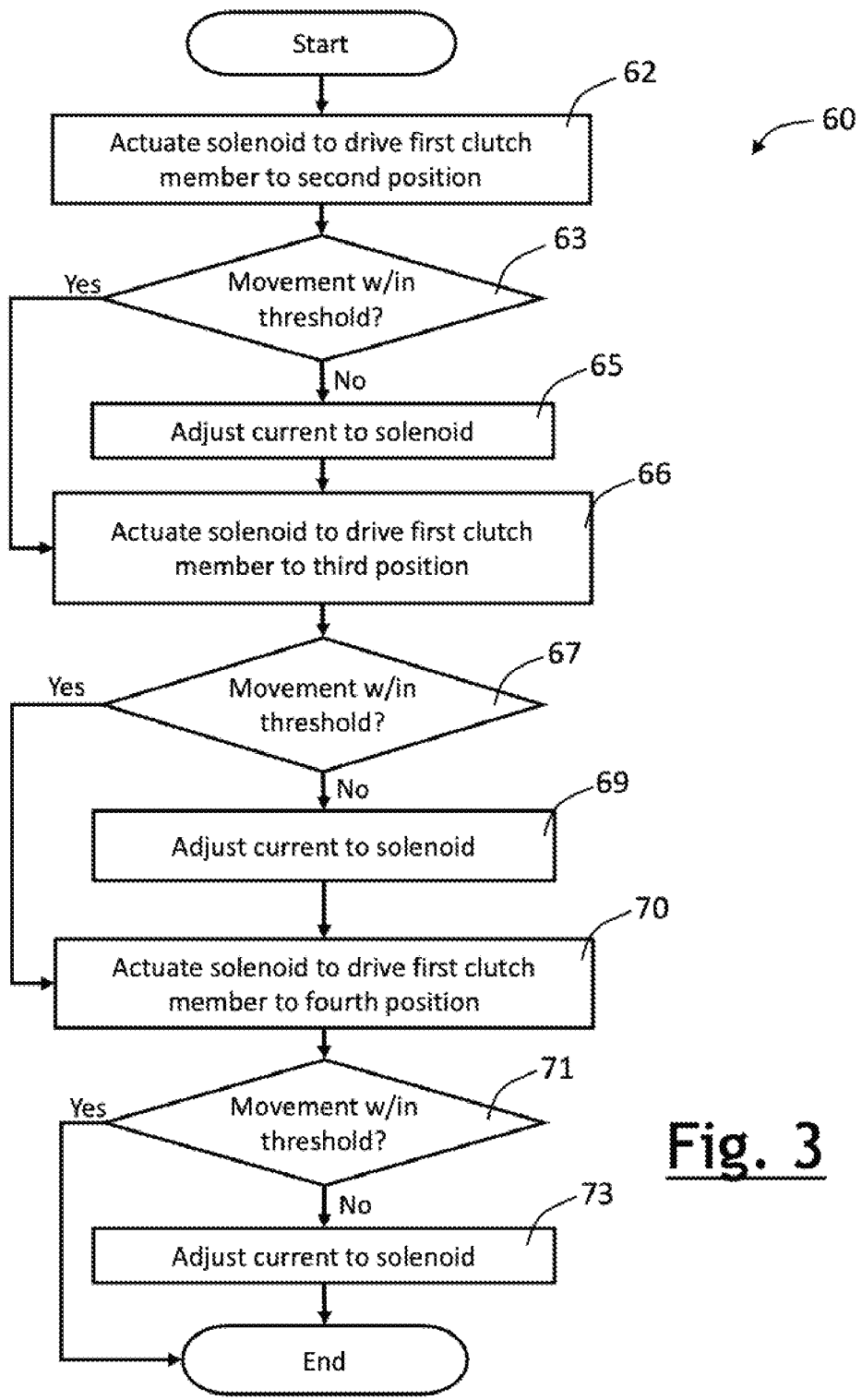
FIG. 3 is a flowchart of a method for engaging a clutch of the disconnect assembly.

FIG. 3 illustrates a method 60 of controlling the solenoid 38 to cause the clutch state to change from disengaged to engaged, by moving the first clutch member 26 into meshed engagement with the second clutch member 28. In step 62, current is applied to the solenoid 38 to actuate the solenoid 38 and drive the solenoid armature 42 so that it moves the first clutch member 26 (e.g. the movement need not be a constant or linear rate) from a first position to a second position. As noted above, this movement of the armature 42 moves the first clutch member 26 along the axis 32 and relative to the second clutch member 28. This movement may occur at a predetermined rate, or over a predetermined duration of time where the rate of movement may be, but is not necessarily, linear.

In the second position, the teeth 34 of the first clutch member 26 are closer to the teeth 36 of the second clutch member 28, and step 62 involves staging the first clutch member 26 closer to the second clutch member 28 for later engagement of the clutch members. In at least some implementations, the clutch teeth 34, 36 are not axially overlapped when the first clutch member 26 is in the second position, although in other implementations, the clutch teeth 34, 36 may be initially axially overlapped in the second position, if desired.

Figure 4:
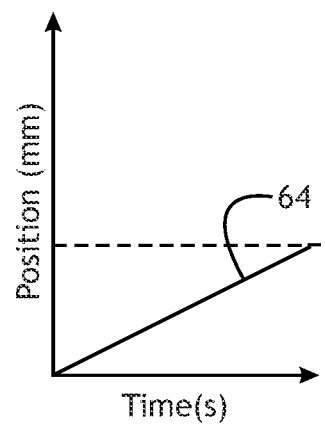
FIGS. 4-6 illustrate movement profiles for phases of engagement of the clutch.

Because initial tooth contact can cause noise and vibration or forces noticeable to vehicle occupants, this first stage of armature 42 and clutch 24 movement can be done at the first rate which may be a slower speed to ensure that initial engagement or meshing of the teeth 34, 36 occurs more gradually, under lower force and with less harshness, if desired. To do this, in at least some implementations, actuation of the solenoid 38 is controlled to cause the armature 42 to move at the first rate, which may if desired be a constant speed, as shown in FIG. 4. As in step 63, this may be done with feedback control enabled by output from the position sensor(s) 46 which can be compared to a predetermined movement profile. The movement profile includes desired positions of the first clutch member 26 over a duration of time for the corresponding range of movement. This is shown in FIG. 4 in which the predetermined movement profile for the first clutch member 26 from the first position to the second position is shown by line 64. With the desired or predetermined movement profile as a base, the control system 48 can monitor the actual movement of the armature 42 and/or first clutch member 26 and, if needed, in step 65 adjust the current provided to the solenoid 38 to achieve the desired rate of movement. For example, if the actual position is lagging behind the desired or predetermined profile position by more than a threshold amount/distance, then the current to the solenoid 38 can be increased to cause faster movement, and vice versa. The current may be provided at a set level as in an open-loop control or with position feedback and varied as a function of a change in position as determined from the position sensor(s). Of course, constant speed is not needed during this staging movement of the first clutch member 26, and the movement here can be non-linear such that the armature 42 moves, for example, more rapidly when it is near the first position and slower near the second position so the rate of movement reaches a desired, lower speed before initial contact between the clutch member teeth 34, 36.

To engage or further engage the clutch members over a limited, initial engagement range, the method continues to step 66 in which actuation of the solenoid 38 is controlled to drive the solenoid armature 42 from the second position to a third position in which the teeth 34 of the first clutch member 26 are partially axially overlapped with the teeth 36 of the second clutch member 28. In at least some implementations, the movement of the first clutch member 26 between the second position and the third position is at a faster rate than is the movement of the first clutch member 26 between the first position and the second position. Further, in at least some implementations, the current provided to the solenoid 38 during this movement has a maximum magnitude that is greater than the magnitude of current used to drive the first clutch member 26 from the first position to the second position.

During this movement of the first clutch member 26 from the second position to the third position, the teeth 34 of the first clutch member 26 are initially meshed with or more fully meshed with and axially overlapped with the teeth 36 of the second clutch member 28. The tooth-to-tooth contact, and the greater extent thereof that occurs as the first clutch member 26 increasingly is driven toward the fully engaged position or state of the clutch 24, creates resistance to further movement of the first clutch member 26 relative to the second clutch member 28.

To overcome this, and ensure continued movement of the first clutch member 26 toward the fully engaged/meshed position, the solenoid 38 can be driven to provide a greater force on the armature 42. This greater force is achieved by providing a higher magnitude of current to the wire coil 40 to generate a stronger electromagnetic field by which the armature 42 is driven. This greater force on the armature 42 may cause the armature 42 to move at a second rate, which may be greater than the first rate of movement used to move the first clutch member 26 to the second position.

Figure 5:
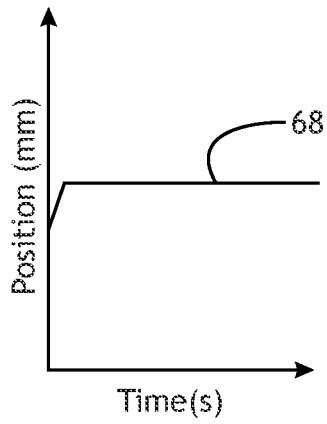

As noted by step 67, this phase of movement can be monitored by the control system 48 as a function of the position information provided by the position sensor(s) 46 as compared to a movement profile illustrated by line 68 in FIG. 5, and the current provided to the solenoid 38 can be adjusted, if needed, in step 69 to achieve a desired rate of movement of the armature 42 and/or first clutch member 26. As shown in FIG. 5, the range of movement in this second phase may be relatively small compared to the overall movement of the armature 42/first clutch member 26. In at least some implementations, this phase may include movement of between about 6% and 30% of the total movement of the first clutch member, which may, in some implementations, be about 0.5 mm to 1.5 mm of movement with an overall movement of between 5 mm and 7.5 mm, although other designs may be used as desired. This greater force and/or rate of movement achieves an initial extent of clutch teeth 34, 36 engagement and can overcome initial misalignment of the clutches 24 wherein axial ends of the teeth 34 of the first clutch member 26 causes the axial ends of the teeth 36 of the second clutch member 28 rather than the teeth 34, 36 becoming meshed. When meshing is detected (e.g. as a function of movement or the instantaneous position of the armature 42 or first clutch member 26), the first clutch member 26 can be driven at the second rate to the third position.

From the third position, it may be desirable to drive the first clutch 24 at a rate slower than the second rate, which can be the same as the first rate or a different, third rate, as desired. This can reduce the dynamics of any impact of the teeth of one clutch member with the base or body of the other clutch member, or other impact between part of a clutch member and a corresponding stop surface at an end of travel. In the method 60, this occurs in step 70 in which the solenoid armature 42 is driven from the third position to a fourth position, in which the teeth 34 of the first clutch member 26 have a greater extent of axial overlap with the teeth 36 of the second clutch member 28 than when the solenoid 38 is in the third position, and which may be a maximum or fully engaged position of the clutch members (e.g. a maximum extent of overlap between the clutch teeth 34, 36).

In at least some implementations, the maximum magnitude of current applied to the solenoid 38 to move the first clutch member 26 from the third position to the fourth position is less than the maximum magnitude of current used to move the first clutch member 26 to the third position, although higher current may be provided as needed to ensure continued movement of the first clutch member 26 toward the fourth position and the fully engaged state. In at least some implementations, a maximum rate of movement of the first clutch member 26 between the third position and the fourth position is less than the maximum rate of movement of the first clutch member 26 between the second position and the third position.

Figure 6:
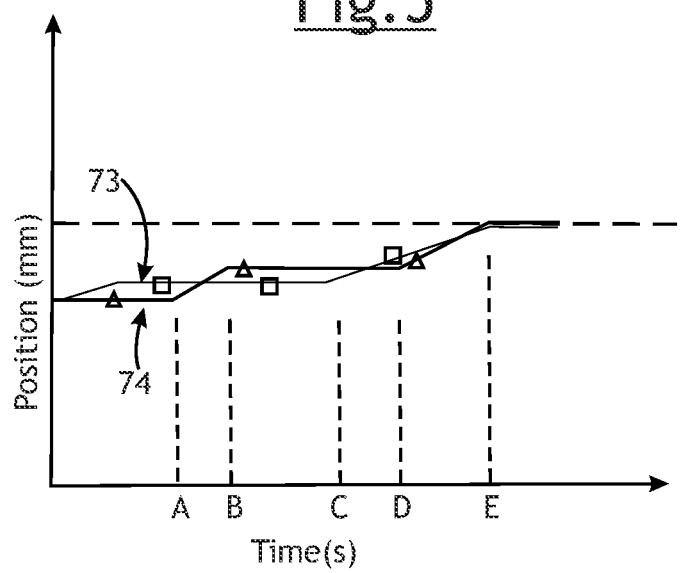

As in the other phases of movement, this movement can be controlled as in step 71 with feedback from the position sensor(s) 46 and with optional current adjustment in step 72 to achieve a desired rate and extent of movement of the armature 42 and first clutch member 26, which may be modeled in a movement profile a representative example of which is shown in FIG. 6. In the example of FIG. 6, the actual position over a period of time of the first clutch member 26 as determined from data from the position sensor(s) 46 is shown by line 73 and the movement profile over this period of time is shown by line 74.

When the actual position is not as advanced as the profiled position at a given time, or over a given time duration, the current applied to the solenoid 38 can be increased to cause increased movement of the first clutch member 26. Among other things, this can prevent or overcome a situation in which the clutch members bind-up and movement of the first clutch member 26 stops. When clutch 24 binding is detected, such as by lack of movement of the first clutch member 26 over a given period of time, the control system 48 might continue to provide current at a predetermined level so that current can build up until a great enough current is provided to cause movement of the first clutch member 26. This may be done with an open-loop or closed-loop control scheme, as desired.

After movement is detected, the profiled position may be maintained until the current decreases below a threshold. When that occurs, the profiled position for the remaining time of actuation can be changed to enable control of the first clutch member 26 to the fourth position at a desired rate, where the difference between the actual position and the profile position is used to control application of current to the solenoid 38. Without adjusting the movement profile, the first clutch member 26 may be driven faster than desired in an attempt to get the actual position to the profiled position in too short of a time duration. So adjusting the profile movement after biding has been detected allows for more controlled movement after the binding event has been overcome and provides a desired rate of movement near the end of movement of the first clutch member 26.

In the example of FIG. 6, during a first portion of this phase from the start of the phase to time (A), the actual position of the first clutch member 26 (or other position-sensed component) is farther toward the fourth position than the modeled position in the movement profile 74 and no change in operation is needed. A second portion of this phase occurs between the first time (A) and a second time (B), and in this second portion the movement profile is modeled for increased movement of the first clutch member 26, and the solenoid is driven to achieve this movement. However, the actual position of the first clutch member 26 did not change due, for example, to binding of the clutch members 26, 28 as noted above. As the power to the solenoid increases, the binding is overcome at time (C) and the movement profile is extended between time (C) and time (D) to delay further movement until the motion is back within a threshold and the current to the solenoid has had time to decrease so that further movement can be at a desired rate (e.g. not too fast, in this situation). That is, absent the detection of binding, the system would have been controlled to cause the movement that begins at time (D) at the earlier time (C), however, the increased current needed to unbind the clutch members might be too high at time (C) and cause undesirably fast movement in the system. From time (D) to time (E), the movement profile is modeled for increased movement to the final, engaged position, and the actual position of the clutch member 24 is shown as being in the final position at time (E), in this example. This binding and movement profile alteration can be implemented in any phase of movement in which binding may occur, as needed to enable a reduced speed of movement when that is desired.

In at least some implementations, the profiled movement during this phase is intended to move the first clutch member 26 at a constant rate, although other movement profiles may be used. For example, the first clutch member 26 may be moved at a greater rate when the first clutch member 26 is nearer to the third position than the fourth position, so that the first clutch member 26 is moving slower near the end of its travel to the fully engaged position.

Figure 7:
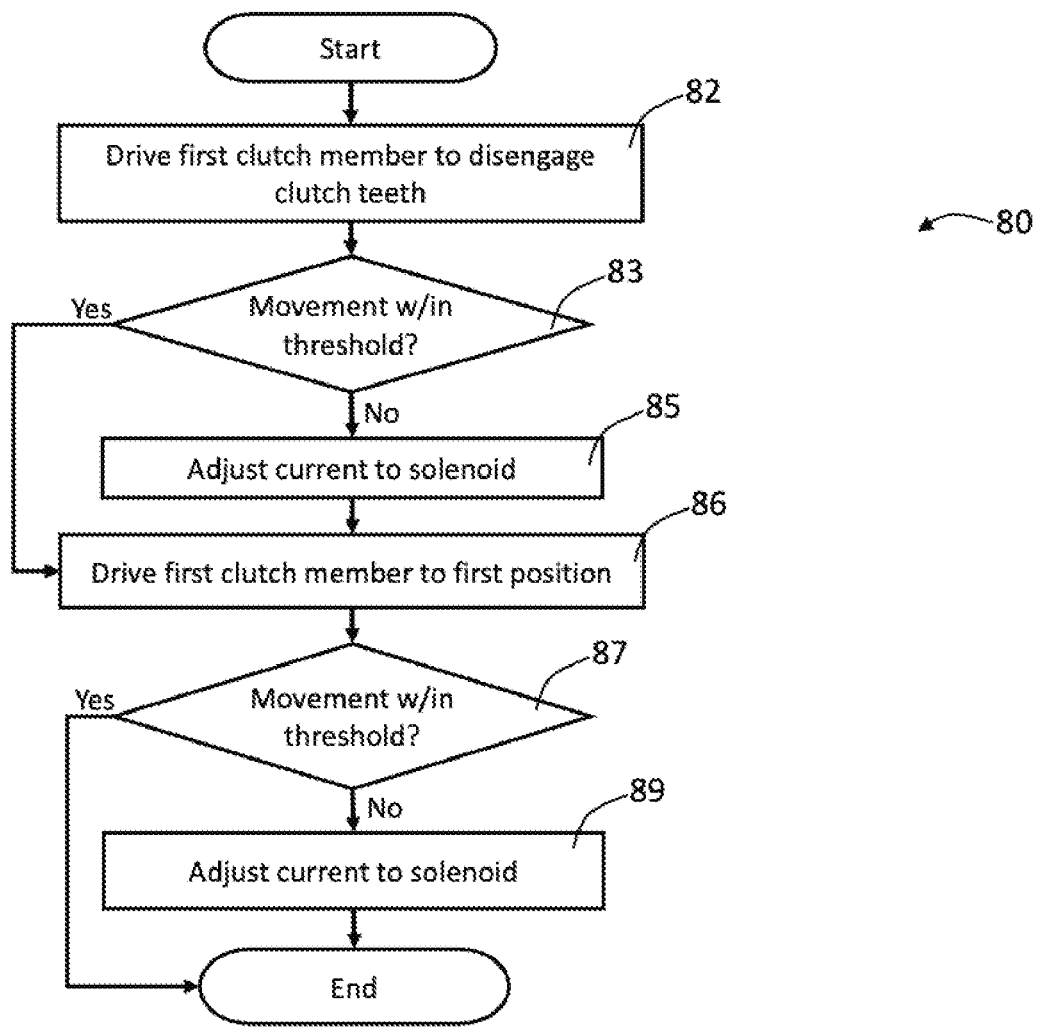
FIG. 7 is a flowchart of a method for disengaging the clutch.

After this phase, the first clutch member 26 should be at a maximum or fully engaged position relative to the second clutch member 28 and the method 60 may end. To thereafter disengage the first clutch member 26 from the second clutch member 28, the first clutch member 26 is driven back toward the first position. FIG. 7 illustrates a method 80 of controlling the solenoid 38 to disengage the clutch 24.

Figure 8:
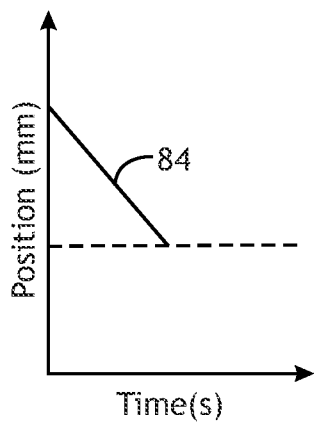
FIGS. 8 and 9 illustrate movement profiles for phases of disengagement of the clutch.

This method 80 starts at step 82 and the first clutch member 26 is in the fourth position which represents a maximum overlap between the clutch teeth 34, 36. To move the first clutch teeth 34 relative to the second clutch teeth 36, and overcome friction between the meshed teeth 34, 36, the solenoid 38 may be provided with an increased current to move the first clutch member 26 from the maximum overlap position to a position in which the teeth 34 of the first clutch member 26 do not overlap with the teeth 36 of the second clutch member 28. Because the teeth 34 are being moved to a disengaged state, noise and forces or vibrations are not an issue as they might be when moving from a disengaged state to an engaged state. In view of this, the first clutch member 26 may be moved at a higher rate of speed, which may be called a first disengagement speed. This speed may be maintained until the clutch teeth 34, 36 are no longer axially overlapped, and in some implementations, this first disengagement speed is terminated prior to the first clutch member 26 reaching the first position which is the end of travel in this disengagement direction. This movement may be controlled in step 83 by comparison to a movement profile 84 such as that shown in FIG. 8, and with position feedback information from the position sensor(s) 46 and corresponding control of the solenoid actuation in step 85, if needed.

Figure 9:
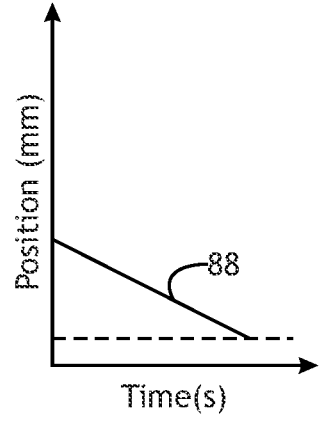

After the first clutch member 26 is disengaged from the second clutch member 28, the rate of movement of the first clutch member 26 is reduced in step 86 to a second disengagement speed that is less than the first disengagement speed to reduce the rate at which the first clutch member 26 reaches the end of its travel in this direction. This reduces the abruptness of the termination of movement of the first clutch member 26 and can reduce noise, vibrations and forces associated therewith. The second disengagement speed may be achieved, in at least some implementations, with a reduced magnitude of current compared to that used in the first disengagement phase to cause the first clutch member 26 to move at the first disengagement speed. This movement may be controlled in step 87 by comparison to a movement profile 88 such as that shown in FIG. 9, and with position feedback information from the position sensor(s) 46 and corresponding control of the solenoid actuation in step 89 if needed.

The method above provides improved control over an actuator 30 for a clutch 24 in a drivetrain 10 assembly. The clutch 24 can be more slowly engaged to reduce the noise and forces of initial engagement. Thereafter, further engagement can be done more rapidly to reduce instances of binding and to overcome misalignment of the clutch members. And final engagement of the clutch members may occur at a slower rate to reduce the noise and forces experienced at the end of travel of the solenoid armature 42 and first clutch member 26 in this engagement direction of travel. Similarly, disengagement of the clutch members can be desirably controlled to ensure swift disengagement of the first clutch member 26 from the second clutch member 28 but to slow travel at the end of the disengagement direction of travel of the solenoid armature 42 and first clutch member 26.

The movement profiles for different phases of movement during engagement and disengagement of the clutch 24 can be controlled with position feedback and corresponding variable actuation or driving of the actuator solenoid 38. The clutch member movement can thereby be done at effective speeds with reduced noise, vibration and harshness. This can improve the driving experience and can improve the longevity and reduce wear and damage of these components in use. Further, the armature may be latched or otherwise releasably retained at positions corresponding to the end of travel in one or both directions, and the armature may be retained prior to being driven also by static friction. To overcome the retention and/or friction forces, an open loop current control scheme may be used to initially move the solenoid, and, in at least some implementations, after the armature begins moving, a closed loop control scheme may be used as noted herein.

What is claimed is:

1. A method of controlling an actuator for a drivetrain disconnect assembly, comprising:

actuating a solenoid of an actuator to drive a first clutch member along an axis and relative to a second clutch member between a first position and a second position, and when the solenoid is in the second position, teeth of the first clutch member are not axially overlapped with teeth of the second clutch member;

actuating the solenoid to drive the first clutch member from the second position to a third position, and when the solenoid is in the third position the teeth of the first clutch member are partially axially overlapped with the teeth of the second clutch member; and actuating the solenoid to drive the first clutch member from the third position to a fourth position, and when the solenoid is in the fourth position, the teeth of the first clutch member have a greater extent of axial overlap with the teeth of the second clutch member than when the solenoid is in the third position, wherein the movement of the first clutch member between the second position and the third position is at a faster rate than is the movement of the first clutch member: a) between the first position and the second position; and b) between the third position and the fourth position.

2. The method of claim 1 wherein the rate of movement of the first clutch member between the first position and the second position, and between the second position and the third position, and between the third position and the fourth position is controlled as a function of a predetermined movement profile.

3. The method of claim 2 wherein feedback from a position sensor is used to control the rate of movement of the first clutch member relative to the predetermined movement profile.

4. The method of claim 3 wherein a magnitude of current supplied to the solenoid is adjusted as a function of the feedback from the position sensor when an actual position of the first clutch member differs by more than a threshold amount from an expected position of the first clutch member according to the predetermined movement profile.

5. The method of claim 2 wherein the predetermined movement profile includes a constant rate of movement of the first clutch member between the first position and the second position.

6. The method of claim 2 wherein the predetermined movement profile includes a constant rate of movement of the first clutch member between the third position and the fourth position.

7. The method of claim 1 wherein actuating the solenoid to drive the first clutch member from the second position to the third position is accomplished with a greater magnitude of current provided to the solenoid than when the solenoid is actuated to move the first clutch member between the first and second position or between the third and fourth position.

8. The method of claim 7 wherein the movement of the first clutch member from the second position to the third position causes initial axial overlap of the teeth of the first clutch member with the teeth of the second clutch member.

9. The method of claim 1 wherein the first position is the end of movement of the first clutch member in a first direction and the fourth position is the end of movement of the first clutch member in a second direction that is opposite to the first direction.

10. The method of claim 1 which also includes driving the first clutch member from the fourth position toward the first position to an intermediate disengaged position in which the teeth of the first clutch member are not axially overlapped with the teeth of the second clutch member, and the first clutch member is driven at a rate of movement that is greater than the rate of movement of the first clutch member from the third position to the fourth position.

11. The method of claim 10 which also includes driving the first clutch member from the intermediate disengaged position to the first position at a rate of movement that is less than the rate of movement of the first clutch member from the fourth position to the intermediate disengaged position.

12. A method of controlling an actuator for a drivetrain disconnect assembly, comprising:
(a) driving a solenoid of an actuator to cause a first rate of movement of a first clutch member relative to a second clutch member from a first position in which teeth of the first clutch member have a maximum spacing from teeth of a second clutch member and to a second position in which the spacing is less than the maximum spacing;
(b) driving the solenoid with an increased current to move the first clutch member from a position in which the teeth of the first clutch member initially overlap with the teeth of the second clutch member to a partially overlapped position in which the teeth of the first clutch member are overlapped with the teeth of the second clutch member less than a full extent of overlap; and
(c) driving the solenoid to move the first clutch member from the partially overlapped position to a maximum overlap position at a second rate that is different than the first rate.

13. The method of claim 12 which also includes:
(d) driving the solenoid with an increased current to move the first clutch member from the maximum overlap position to a position in which the teeth of the first clutch member do not overlap with the teeth of the second clutch member but wherein the first clutch member is spaced from the first position; and
(e) driving the solenoid at a reduced rate or with a reduced magnitude of current compared to step (d) to move the first clutch member to the first position.

14. The method of claim 13 wherein the rate of movement of the first clutch member in step (d) and step (e) is controlled as a function of a predetermined movement profile.

15. The method of claim 14 wherein feedback from a position sensor is used to control the rate of movement of the first clutch member relative to the predetermined movement profile.

16. The method of claim 12 wherein the rate of movement of the first clutch member in step (a), step (b) and step (c) is controlled as a function of a predetermined movement profile.

17. The method of claim 16 wherein feedback from a position sensor is used to control the rate of movement of the first clutch member relative to the predetermined movement profile.

18. The method of claim 17 wherein a magnitude of current supplied to the solenoid is adjusted as a function of the feedback from the position sensor when an actual position of the first clutch member differs by more than a threshold amount from an expected position of the first clutch member according to the predetermined movement profile.

19. The method of claim 12 wherein the solenoid is driven by providing a current to the solenoid, and a maximum magnitude of the current supplied to the solenoid in step (c) is less than a maximum magnitude of current supplied to the solenoid in step (b).

20. The method of claim 12 wherein a maximum rate of movement of the first clutch member during step (c) is less than a maximum rate of movement of the first clutch member during step (b).

* * * * *